(12) United States Patent  (10) Patent No.: US 9,235,654 B1
Gupta et al.  (45) Date of Patent: Jan. 12, 2016

(54) QUERY REWRITES FOR GENERATING AUTO-COMPLETE SUGGESTIONS

(71) Applicant: Google Inc., Mountain View, CA (US)

(72) Inventors: Nitin Gupta, Santa Clara, CA (US); Bartlomiej M. Niechwiej, Fremont, CA (US); Abhinandan Sujit Das, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/759,926

(22) Filed: Feb. 5, 2013

Related U.S. Application Data

(60) Provisional application No. 61/595,542, filed on Feb. 6, 2012.

(51) Int. Cl.
    *G06F 17/30* (2006.01)
(52) U.S. Cl.
    CPC ........ *G06F 17/3097* (2013.01); *G06F 17/3053* (2013.01)
(58) Field of Classification Search
    CPC .................... G06F 17/3097; G06F 17/3053
    USPC ................................................. 707/765, 767
    See application file for complete search history.

(56) References Cited

U.S. PATENT DOCUMENTS

| | | | |
|---|---|---|---|
| 7,409,383 B1 * | 8/2008 | Tong et al. | |
| 7,814,085 B1 * | 10/2010 | Pfleger et al. | 707/708 |
| 7,890,526 B1 * | 2/2011 | Brewer et al. | 707/767 |
| 8,417,718 B1 * | 4/2013 | Finkelstein et al. | 707/767 |
| 8,515,731 B1 * | 8/2013 | Ramirez Robredo et al. | 704/2 |
| 8,583,675 B1 * | 11/2013 | Haahr et al. | 707/767 |
| 8,898,182 B2 * | 11/2014 | Bhatia et al. | 707/767 |
| 2005/0149499 A1 * | 7/2005 | Franz et al. | 707/3 |
| 2006/0230035 A1 * | 10/2006 | Bailey et al. | 707/5 |
| 2007/0050351 A1 * | 3/2007 | Kasperski et al. | 707/4 |
| 2007/0198495 A1 * | 8/2007 | Buron et al. | 707/3 |
| 2009/0055380 A1 * | 2/2009 | Peng et al. | 707/5 |
| 2009/0171759 A1 * | 7/2009 | McGeehan | 705/10 |
| 2009/0259651 A1 * | 10/2009 | Tankovich et al. | 707/5 |
| 2012/0278350 A1 * | 11/2012 | Bhatia et al. | 707/767 |
| 2012/0323952 A1 * | 12/2012 | Bhatia et al. | 707/767 |

* cited by examiner

*Primary Examiner* — Jorge A Casanova

(57) ABSTRACT

A computer-implemented method for proving complete query suggestions, performed by a server system, includes receiving a partial search query from a client system. A database of complete search queries is searched to identify a first set of matching complete search queries. If the first set of matching complete search queries fails to satisfy predefined criteria (e.g., with respect to the quantity and/or quality of the matching complete search queries), a rewrite of the received partial search query is performed to produce a first set of rewritten partial search queries. The database of complete search queries is searched to identify a second set of complete search queries matching any of the first set of rewritten partial search queries. At least a subset of the second set of matching complete queries are sent to the client system.

21 Claims, 13 Drawing Sheets

Historical Queries Database 132

| Query | Frequency |
|---|---|
| <You Tube> | 100,000,000,000 |
| ⋮ | ⋮ |
| <Radiohead> | 90,000,000,000 |
| ⋮ | ⋮ |
| <Thom Yorke> | 700,000,000 |
| ⋮ | ⋮ |
| <OK Computer> | 600,000 |
| ⋮ | ⋮ |
| <In Rainbows> | 100,000 |
| ⋮ | ⋮ |
| <Amnesiac> | 89 |
| ⋮ | ⋮ |

Figure 12

QUERY REWRITES FOR GENERATING AUTO-COMPLETE SUGGESTIONS

RELATED APPLICATIONS

This application claims priority to U.S. Provisional Patent Application No. 61/595,542, filed Feb. 6, 2012, which is hereby incorporated by reference in its entirety.

TECHNICAL FIELD

The present invention relates generally to the field of search engines for locating documents in a computer network (e.g., a distributed system of computer systems), and in particular, to method and system for suggesting search queries to a user.

BACKGROUND

Search engines provide a powerful tool for locating documents in a large database of documents, such as the documents on the World Wide Web (WWW) or the documents stored on the computers of an Intranet. The documents are located in response to a search query submitted by a user. A search query may consist of one or more query terms.

In one approach to entering queries, the user enters the query by adding successive query terms until all query terms are entered. Once the user signals that all of the query terms of the search query have been entered, the search query is sent to the search engine. The user may have alternative ways of signaling completion of the search query by, for example, entering a return character, by pressing the enter key on a keyboard or by clicking on a "search" button on a graphical user interface. Once the search query is received by the search engine, it processes the search query, searches for documents responsive to the search query, and returns a list of documents to the user.

Because the original search query is only sent to the search engine when the user signals that the search query is complete, time passes while the user finishes entering or editing the full search query. It would be desirable to have a method and system for quickening this process.

SUMMARY

Embodiments of the present invention, as disclosed in this document, overcome the limitations and disadvantages described above by providing methods, systems, and graphical user interfaces (GUIs) for providing query completion suggestions, such as rewritten partial search queries.

Some embodiments provide autocomplete suggestions which complete the term or terms being entered by the user. However, some autocompletion suggestions of this sort are less useful to users entering long search queries with a large number of query terms or to users submitting a search query with one or more query terms not found in popular search queries.

One aspect is a computer-implemented method for providing complete query suggestions. The method is performed on a server system having one or more processors and memory storing one or more programs for execution by the one or more processors. A partial search query having a plurality of query terms is received from a client system. A database of complete search queries is searched to identify a first set of matching complete search queries. If the first set of matching complete search queries fails to satisfy predefined criteria (e.g., with respect to the quantity and/or quality of the matching complete search queries), a rewrite of the received partial search query is performed to produce a first set of rewritten partial search queries. The database of complete search queries is searched to identify a second set of complete search queries matching any of the first set of rewritten partial search queries. At least a subset of the second set of matching complete queries are sent to the client system.

Another aspect is a server system comprising one or more processing processors (sometimes called processing units or CPUs) for executing programs and memory storing the programs to be executed by the one or more processors. The programs include instructions to perform the aforementioned method of providing complete query suggestions.

Yet another aspect involves embodiments of a non-transitory computer storage medium storing one or more programs to be executed by one or more processors of a computer system. The programs include instructions to perform the aforementioned method of providing complete query suggestions.

This summary of disclosed embodiments is not comprehensive and is not intended to delineate the scope of the claims. Its sole purpose is to present a brief overview of some embodiments in a simplified form as a prelude to the more detailed description presented below.

BRIEF DESCRIPTION OF THE DRAWINGS

FIG. 12 depicts a portion of a historical queries database used in identifying a set of matching complete queries, in accordance with some embodiments.

Like reference numerals refer to corresponding parts throughout the drawings.

DESCRIPTION OF EMBODIMENTS

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the described embodiments. However, the embodiments may be practiced without these specific details. In other instances, well-known methods, procedures, components, and circuits have not been described in detail so as not to unnecessarily obscure aspects of the embodiments.

Figure 1:
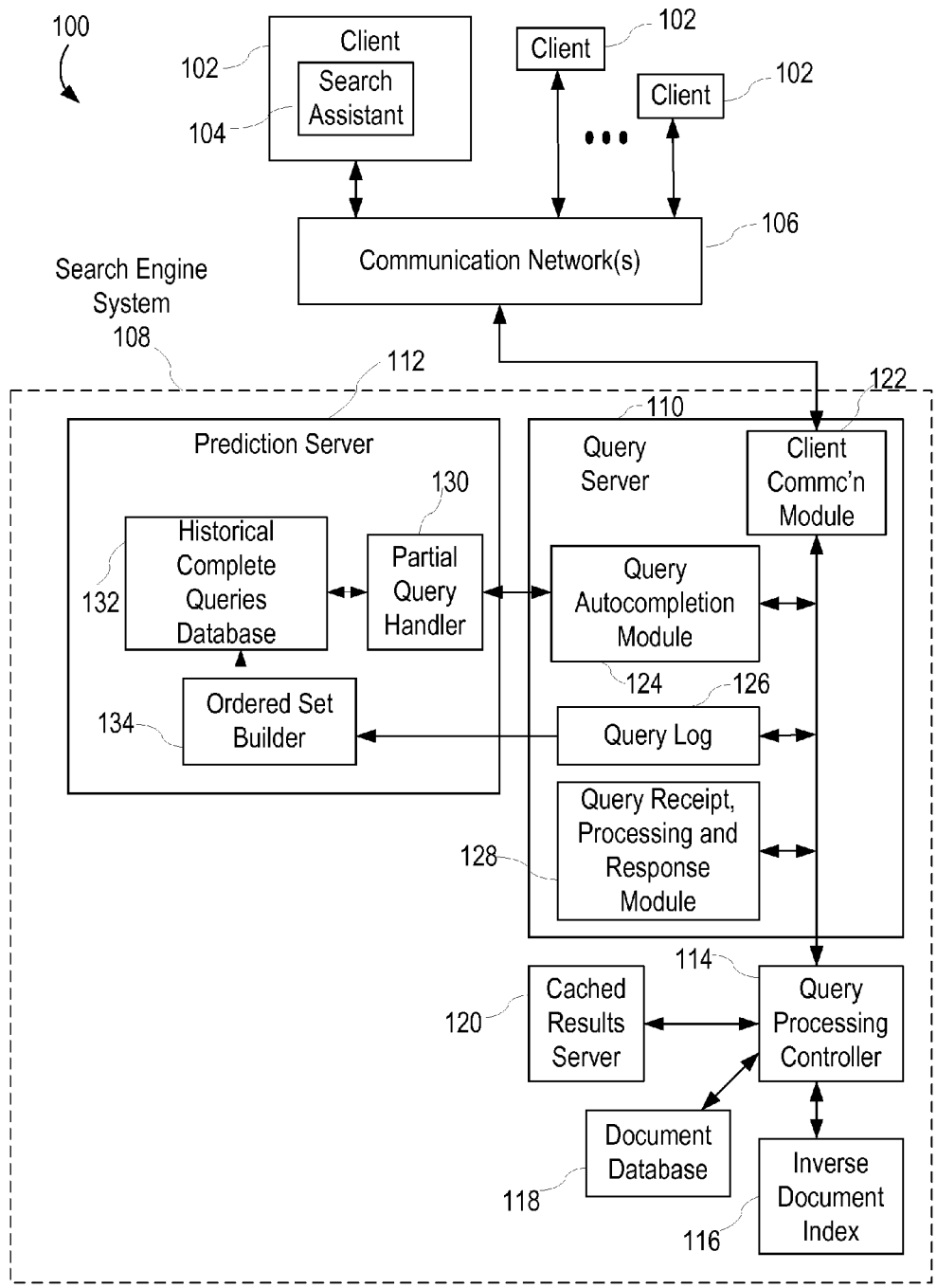
FIG. 1 is a block diagram of a search system, in accordance with some embodiments.

FIG. 1 is a block diagram of a distributed system 100, in accordance with some embodiments. FIG. 1 shows various functional components which will be referred to in the detailed discussion which follows. The distributed system 100 may include one or more client devices or systems 102, herein called client systems 102 for ease of reference. Operations of a respective client system 102 are depicted on the left side of the flow chart in FIG. 2 and in the flow chart of FIG. 3. A client system 102 optionally includes a search assistant 104. A communications network 106 connects respective client systems 102 to a search engine system 108, herein called search engine 108 for ease of reference. In some embodiments, search engine 108 includes a query server 110 connected to the communications network 106, a prediction server 112, a query processing controller 114, an inverse document index 116, a document database 118, and a cached results server 120. In some implementations, fewer and/or additional modules or functions are included in the search engine system 108.

In some implementations, query server 110 also includes a client communications module 122, a query autocompletion module 124, a historical query log 126, and a query receipt, processing and response module 128, which are all interconnected. In some embodiments, fewer and/or additional modules or functions are included in query server 110. The modules shown in FIG. 1 as being part of query server 110 represent functions performed in an exemplary embodiment. The prediction server 112 is connected to query autocompletion module 124 and a query log 126.

The historical query log 502 contains a log of previously submitted queries received by the search engine 108 over a period of time. In some embodiments, the queries are from a community of users sharing at least one similar characteristic such as belonging to the same workgroup, using the same language, having an internet address associated with the same country or geographic region, or the like. The selection of the community determines the pool of previously submitted queries used to populate the historical complete queries database 132, from which the suggested complete queries are drawn. Different communities would tend to produce different sets of predictions.

In some embodiments, prediction server 112 is a server system that includes a partial query handler 130, which receives partially completed original queries and suggests complete search queries using a historical queries database 132. In some implementations, prediction server 112 also includes an ordered set builder 134 which processes log records (in query log 126) of previously completed search queries submitted by users in a community of users to generate the historical complete queries database 132. In some implementations, fewer and/or additional modules or functions are included in prediction server 112.

Query processing controller 114 is connected to an inverse document index 116, a document database 118, and a cached results server 120. The inverse document index 116 and document database 118 are sometimes collectively called the document database. In some embodiments, "searching the document database" means searching the inverse document index 116 to identify documents matching a specified search query or term. Query processing controller 114 handles the process of "executing" complete search queries and providing search results to be returned to a requesting client. In some implementations, when appropriate, query processing controller 114 obtains cached search results from cached results server 120 to reduce the workload on inverse document index 116 and document database 118.

In contrast, prediction server 112 produces suggested complete search queries in response to partial search queries received by the search engine. The suggestions produced by prediction server 112 can be thought of as "predictions" of the next search query that user intends to enter. When any of the suggestions produced by prediction server 112 are selected by the user that is typically considered to be indicative that the prediction server was successful.

Although illustrated as discrete blocks in the figure, FIG. 1 is intended more as a functional description of some embodiments rather than a structural mapping of the functional elements.

Figure 2:
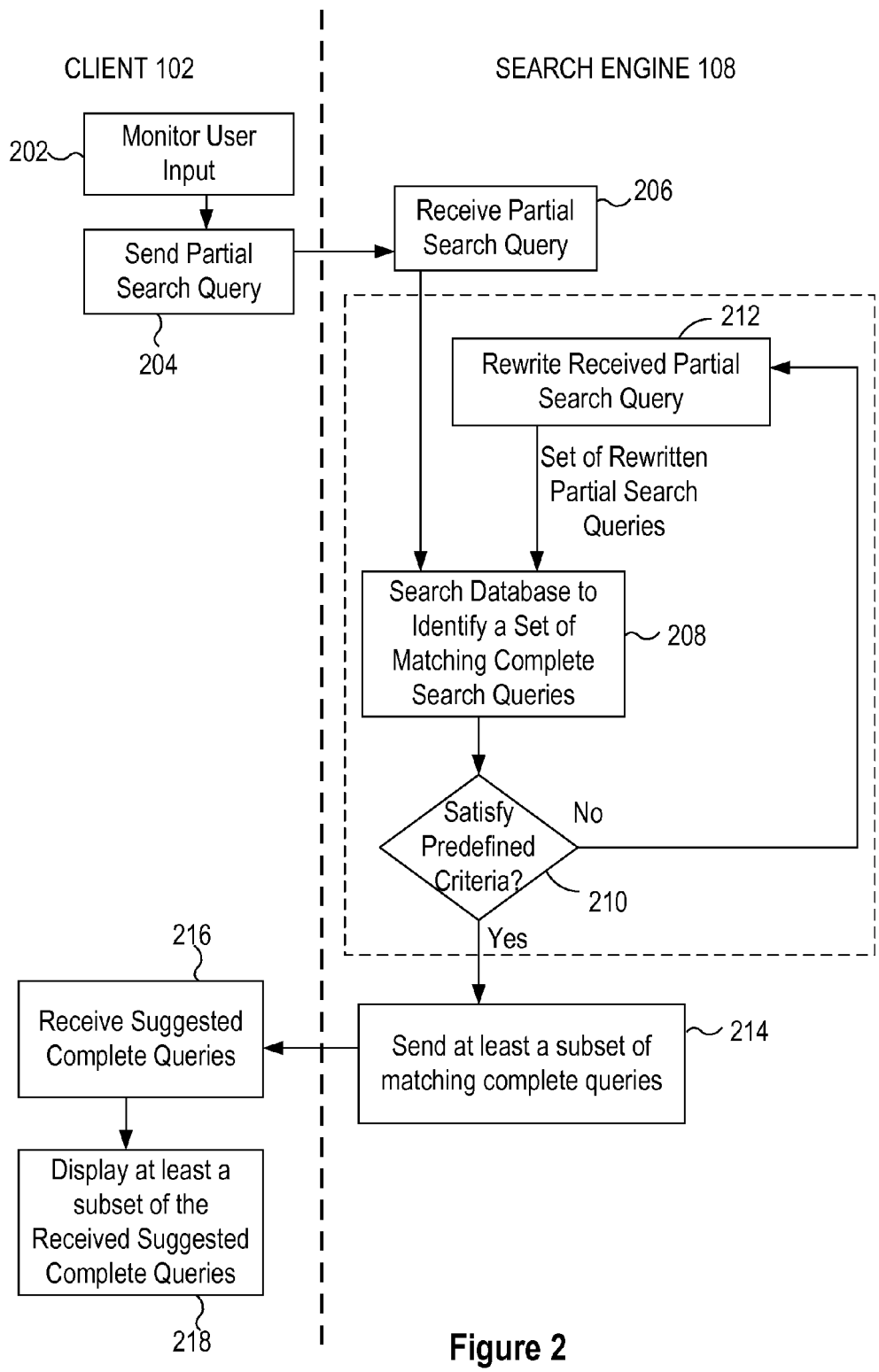
FIG. 2 presents an overview of a process for rewriting queries for generating auto-complete suggestions, in accordance with some embodiments.

FIG. 2 depicts a flow chart that provides an overview of a process for rewriting queries for generating auto-complete suggestions, in accordance with some embodiments. The left side of FIG. 2 shows operations performed at a client system 102, shown in FIGS. 1 and 11. The client system 102 monitors (202) for user input, for example in a query search box in an application or web page. After a user starts to enter a search query, the client system 102 sends (204) the partial search query to the search engine 108, shown in FIGS. 1 and 10.

The client system 102 sends (204) the partial search query to the search engine 108. The search engine 108 receives (206) the partial search query from the client system 102. Then, the search engine 108 searches (208) a database of complete search queries, for example the historical complete queries database 132 shown in FIGS. 1 and 12, to identify a first set of matching complete queries. In accordance with a determination that the first set of matching complete queries fails to satisfy (210—No) predefined criteria (e.g., with respect to the quantity and/or quality of the matching complete search queries), a rewrite of the received partial search query is performed (212) to produce a first set of rewritten partial search queries.

In some implementations, the predefined criteria tested by operation 210 are not satisfied when (A) the number of complete queries in the first set of matching complete queries is less than N (e.g., an integer greater than 1, and typically less than 10). In some other implementations, the query suggestions in the first set of matching complete queries are scored, and the predefined criteria tested by operation 210 are not satisfied when either (A) the number of complete queries in the first set of matching complete queries is less than N (e.g., an integer greater than 1, and typically less than 10), or (B) the total score of the N highest scoring complete queries (i.e., the N complete queries in the first set of matching complete queries having the highest scores) is less than Y, where Y is a predefined threshold value. In some implementations, the complete queries in the first set of matching complete queries are individually scored and the predefined criteria tested by operation 210 are not satisfied when the average score of the N highest scoring complete queries in the first set of matching complete queries is less than Z, where Z is a predefined threshold value. In some implementations, a respective complete query in the first set of matching complete queries is scored with respect to the popularity of the respective complete query. For example, in some implementations, the popularity a respective complete query corresponds to a number of times users submitted the respective complete query to a search engine in a predefined period of time. In another example, the popularity of a respective complete query corresponds to a number of users or clients which submitted the respective complete query to a search engine in a predefined period of time. In some implementations, a respective complete query in the first set of matching complete queries is scored with respect to the popularity of the respective complete query and also with respect to additional criteria, such as one or more of: how well the respective complete query matches a user profile of the user from whom the partial search query was received, a query success score (e.g., a score corresponding to a number of times users clicked on or otherwise selected for viewing search results produced by the respective complete query in a predefined period of time), and/or an inverse document frequency of one or more terms in the respective complete query that are not present as complete terms in the partial search query received at operation 206.

After a rewrite of the received partial search query is performed to produce (212) a first set of rewritten partial search queries, the search engine 108 searches (208) the database of complete search queries to identify a second set of matching complete queries matching any of the first set of rewritten partial search queries. The search engine 108 sends (212) at least a subset of the second set of matching complete search queries to the client system 102.

The client system 102 receives (216) at least a subset of the second set of matching complete search queries, and displays (218) at least a subset of the second set of matching complete search queries as auto-complete suggestions.

In some embodiments, in accordance with a determination that the first set of matching complete queries does satisfy (210-Yes) predefined criteria, the search engine 108 sends (214) at least a subset of the first set of matching complete search queries to the client system 102. The client system 102 receives (216) at least a subset of the first set of matching complete search queries, and displays (218) at least a subset of the first set of matching complete search queries as auto-complete suggestions.

Figure 3:
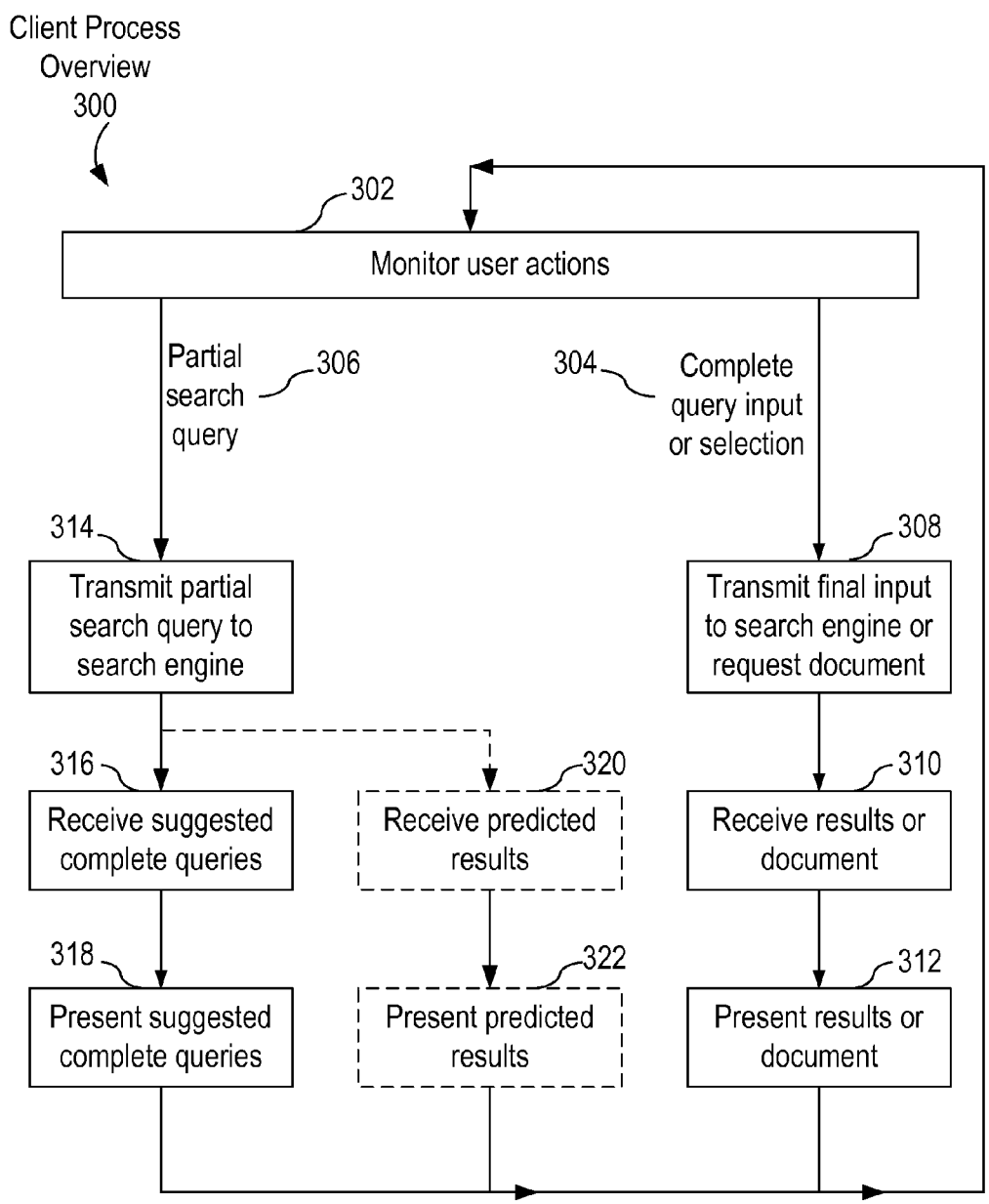
FIG. 3 includes a flow chart of a client side process (e.g., in a search assistant), in accordance with some embodiments.
Figure 11:
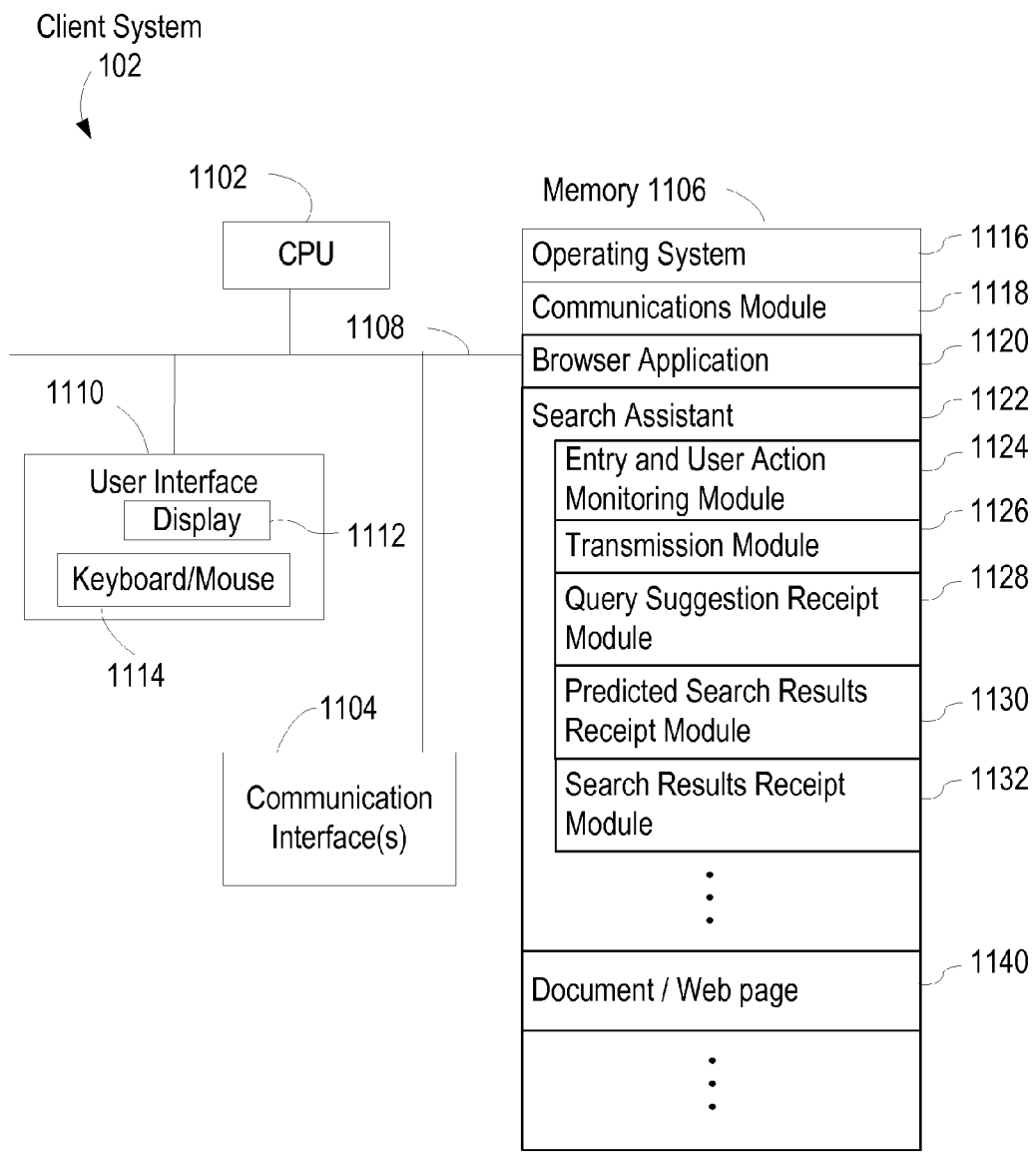
FIG. 11 is a block diagram of a client device or system, in accordance with some embodiments.

FIG. 3 includes a flow chart of a client side process 300, performed by a client system, such as client system 102 (sometimes herein called the client) shown in FIGS. 1, 2, and 11, in accordance with some embodiments. Client side process 300 is optionally performed by search assistant 104, shown in FIGS. 1 and 11, in the client system 102. Search assistant 104 may be software embedded in a web page, for example a web page that includes a search box for entering a search query. Client side process 300 is associated with partial search query input, complete query input, complete search query selection, and presentation of search queries and, optionally, search results. The client monitors (302) user actions. User actions include input (306) of a partial search query, input (304) of a complete query, or selection (304) of a complete query.

When the user action is entry or selection (304) of a complete query, which in some embodiments is indicated by the user hitting return or selection of an affordance such as a "search" button, the client system 102 transmits (308) the complete query to the search engine 108. The search engine 108 processes the complete query and returns search results responsive to the complete query. The client receives (310) the search results, and presents (312) at least a subset of the received search results.

Figure 13A:
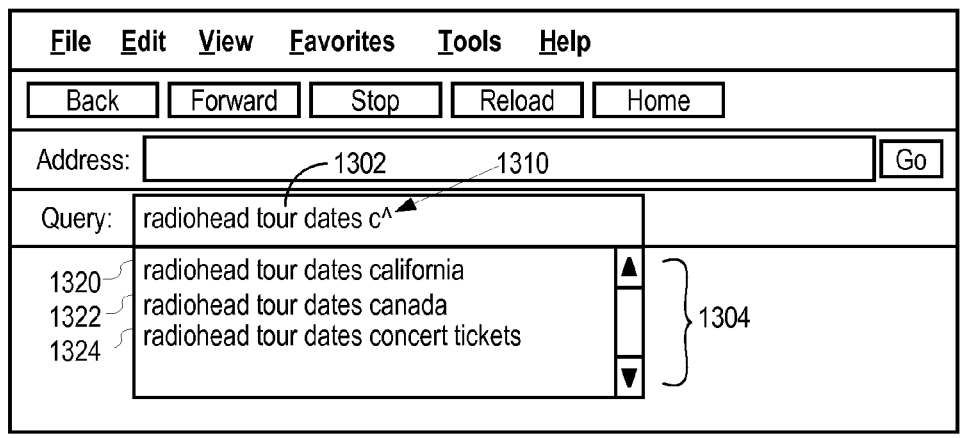
FIG. 13A depicts an example of complete search query suggestions, in accordance with some embodiments.
Figure 13B:
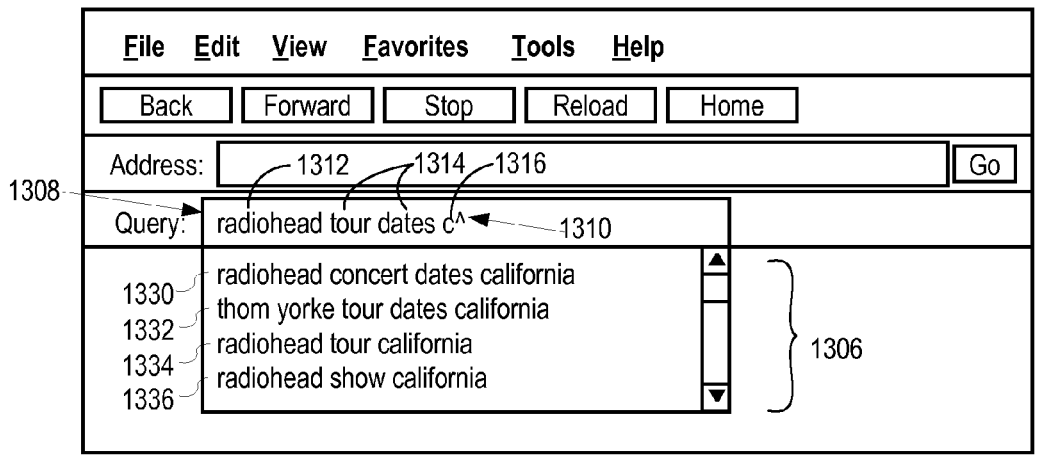
FIG. 13B depicts another example of rewritten complete search query suggestions, in accordance with some embodiments.

When the user action is entry (306) of a partial search query, client 102 transmits (314) the partial search query to the search engine 108. The client 102 receives (316) suggested complete queries, and presents (318), for example displays, at least a subset of the suggested complete queries. In some embodiments, the suggested complete queries are presented (316) within a search window as a pop-up window or drop down menu under the search box, as shown in FIGS. 13A and 13B. In some embodiments, the number of suggested complete queries displayed depends on the client. For example, fewer suggested complete queries are displayed on a mobile device than are displayed on a desktop device.

When the user action is a selection (304) of one of the complete queries presented in operation 318, the selected complete query is transmitted (308) to the search engine 108. The search engine 108 processes the query and returns search results responsive to the selected query. The client 102 receives (310) the search results and presents (312) at least a subset of the search results.

In some embodiments, when the user action is selection (304) of a document in the search results, a request for that document is transmitted (308) to the search engine 108. The search engine 108 processes the request and returns the requested document. The client 102 receives (310) the document and presents (312) the document. In some other implementations, when the user selects (304) a document in the search results, an http request is sent (308) to the server that hosts the document, which responds by sending the requested document to the client (assuming the requested document is still hosted by the server). The client 102 receives (310) the document and presents (312) the document.

In some embodiments, when the client 102 receives (316) suggested complete search queries, the client 102 optionally additionally receives (320) predicted results from the search engine 108. This activity overlaps with receiving (316) the suggested complete search queries, in that both sets of information are concurrently presented (318 and 322), as indicated by the dashed line to 320 in FIG. 3. The predicted results are presented (322) and the monitoring (302) of user actions resumes.

In some implementations, the predicted results correspond to documents or information that would have been returned based on the request being one of the suggested complete search queries. For example, in some implementations, the results presented (322) may be one or more search results relevant to a highest ranked suggested complete search query. Accordingly, the client may present (322) predicted results that match a desired query of the user before the user finishes entering the original query. In such situations, the processing latency as viewed by the user is effectively reduced to less than zero because the user did not have to complete the input to obtain the desired result.

Figure 4:
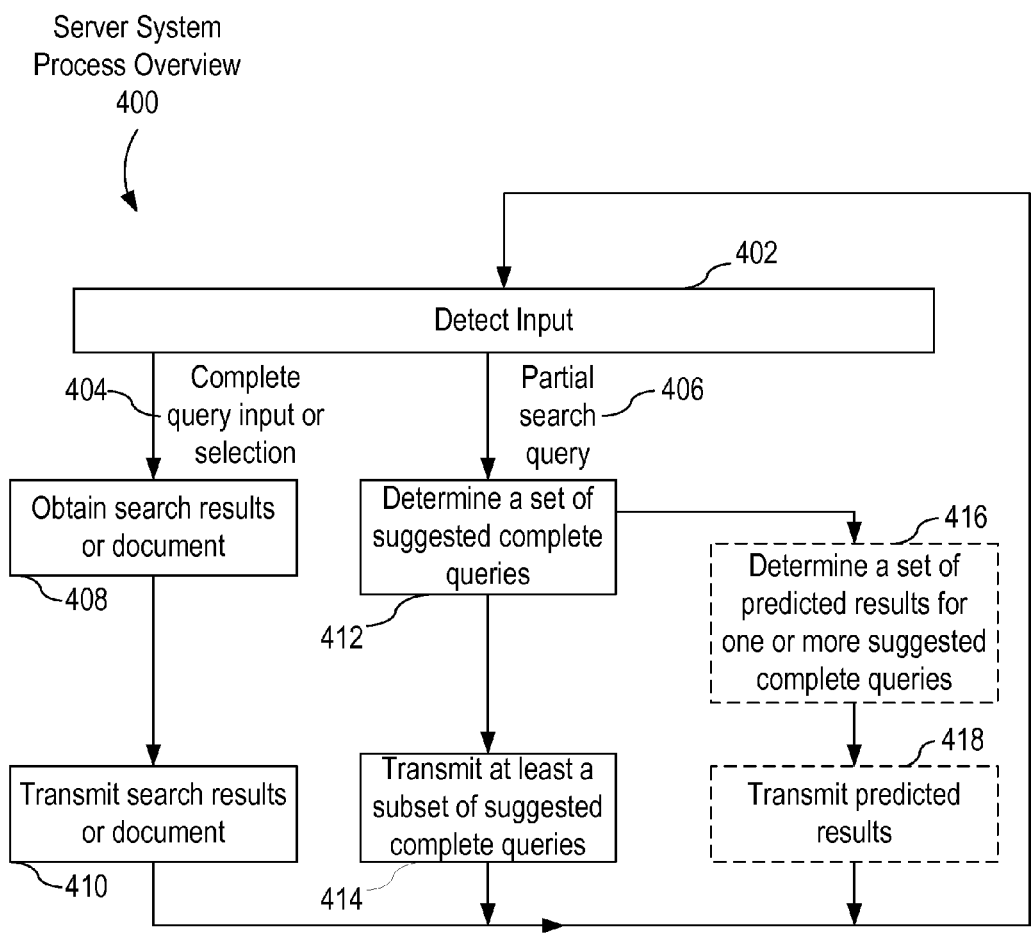
FIG. 4 includes a flow chart of a process, performed by a search engine system, in accordance with some embodiments.
Figure 10:
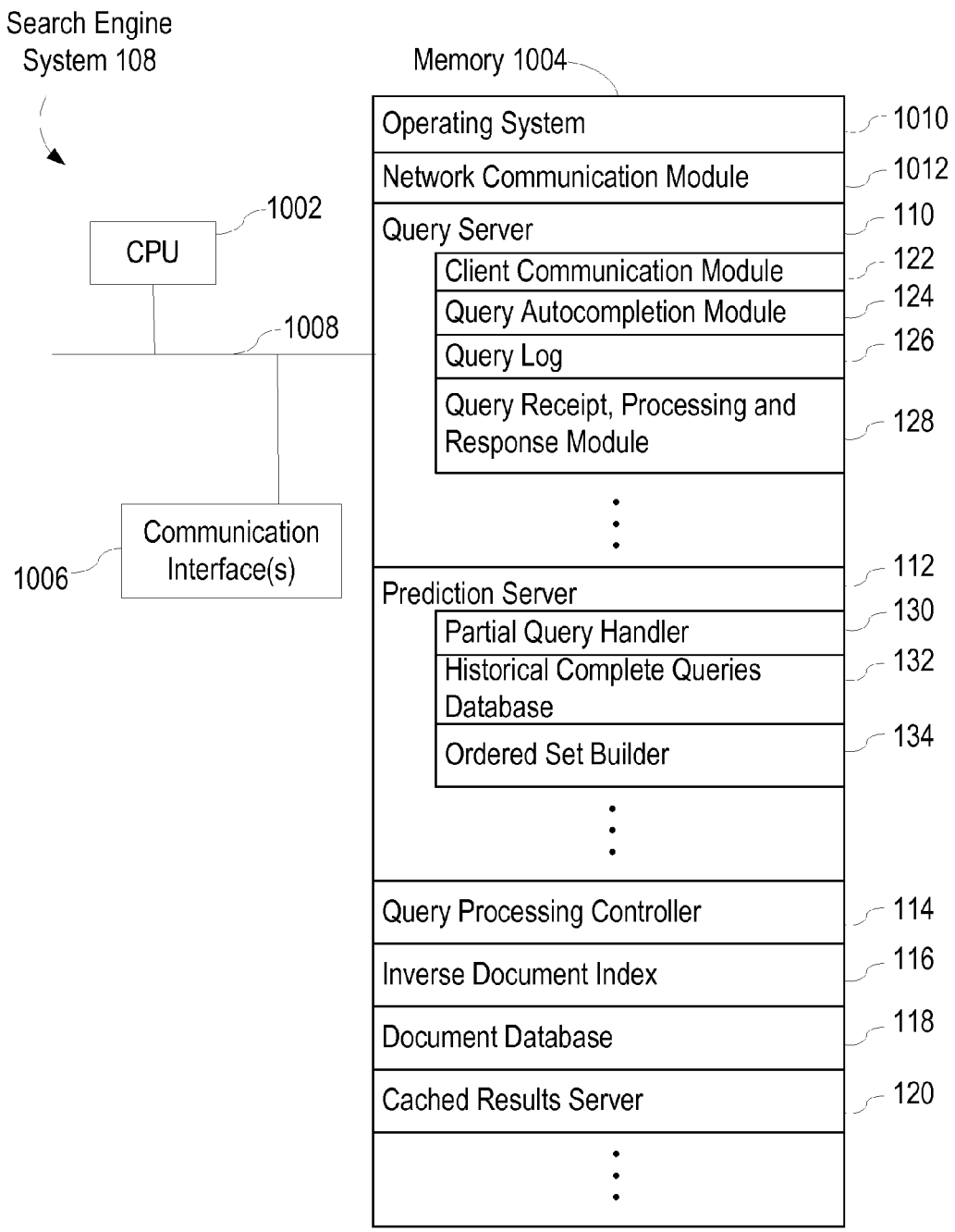
FIG. 10 is a block diagram of a search engine system, in accordance with some embodiments.

FIG. 4 includes a flow chart of a search engine system side process 400 performed by a search engine, such as the search engine 108 shown in FIGS. 1, 2, and 10, for detecting query input, query selection, and transmitting responses thereto in accordance with some embodiments. The search engine 108 detects (402) input (received from a client 102, shown in FIGS. 1, 2, and 11). The input is typically input (406) of a partial search query, input (404) of a complete search query, or selection (404) of a complete query, and optionally, search results.

When the detected input is a complete query 404 or selection of a complete query 404, the search engine 108 processes the query and obtains (408) the corresponding search results responsive to the query. The search engine 108 then transmits (410) the search results to the client 102 for presentation.

In some implementations, when the received input is a selection of a document 404 in the search results, the search engine 108 obtains (408) the requested document. The search engine 108 then transmits (410) the requested document to the client 102. In some other implementations, not shown in FIG. 4, when the user selects a document in the search results, an http request is sent to the server that hosts the document, which responds to sending the requested document to the client (assuming the requested document is still hosted by the server). The search engine 108 obtains (408) the document and transmits (410) the document to the client 102.

When the received input is a partial search query 406, the search engine 108 determines (412) a set of suggested complete queries. The search engine 108 then transmits (414) the suggested complete queries to the client 102.

In some embodiments, in addition to determining (412) a set of suggested complete queries, the search engine system additionally determines (416) a set of predicted search results for one or more of the suggested complete queries, as described with respect to FIG. 3. The predicted search results are transmitted (418) to the client 102.

Figure 5:
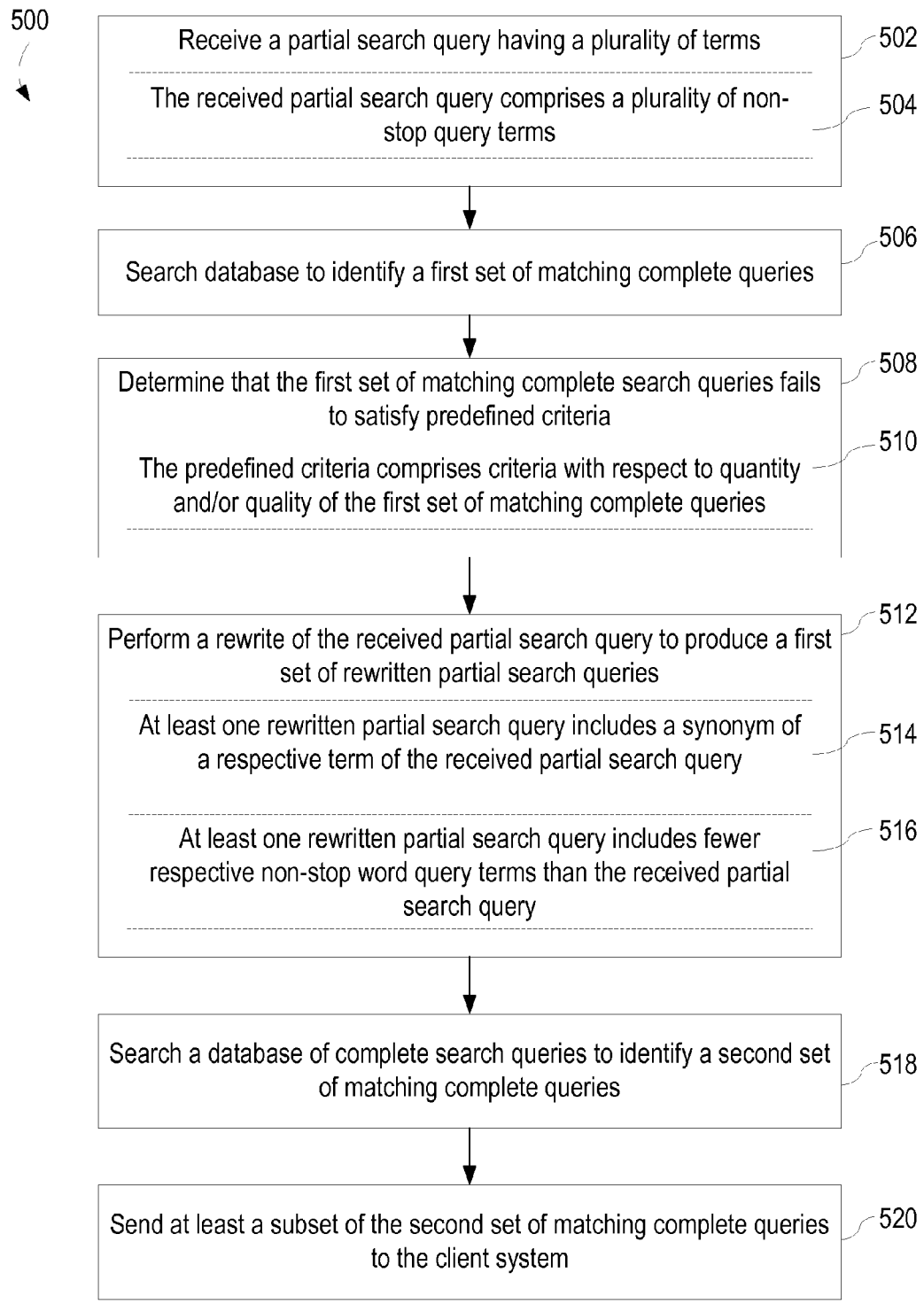
FIG. 5 includes a flow chart of a process for generating complete search query suggestions, in accordance with some embodiments.

FIG. 5 depicts a flow chart of a process 500 for generating complete search query suggestions, in accordance with some embodiments. The process for generating complete suggestions is performed at a search engine, such as search engine system 108 (sometimes herein called the search engine) shown in FIGS. 1, 2, and 10, in accordance with some embodiments. The search engine 108 receives (502) a partial search query having a plurality of terms. Optionally, the partial search query comprises (504) a plurality of non-stop word query terms. In some implementations, each stop word term is represented in a table (e.g., a white-list) cached or stored by the search engine.

The search engine 108 then searches (506) a database to identify a first set of matching complete queries. In some implementations, the database searched by the search engine to identify the first set of matching complete queries is the historical complete queries database 132, shown in FIGS. 1, 10, and 12. When the search engine 108 determines that the first set of matching complete queries fails to satisfy (508) predefined criteria, additional operations shown in FIG. 5 are performed, as described next. However, when the search engine 108 determines that the first set of matching complete queries do satisfy (210—Yes, FIG. 2) the predefined criteria, the search engine 108 sends (214, FIG. 2) at least a subset of the first set of matching complete search queries to the client system 102. In some implementations, the predefined criteria comprises criteria with respect to quantity and/or quality of the first set of matching search queries (510). Examples of the predefined criteria are discussed above with respect to operation 210.

When the search engine 108 determines that the first set of matching complete queries fails to satisfy (508) predefined criteria, the search engine 108 then performs (512) a rewrite of the received partial search query to produce a first set of rewritten partial search queries. In some cases (e.g., depending on characteristics of the received partial search query), the first set of rewritten partial search queries includes at least one rewritten partial search query that includes (514) a synonym of a respective query term of the received partial search query. Furthermore, in some cases (e.g., depending on characteristics of the received partial search query), the first set of rewritten partial search queries includes at least one rewritten partial search query that includes (516) fewer respective non-stop word query terms than the received partial search query.

The search engine 108 then searches (518) a database of complete search queries (shown in 208, FIG. 2) to identify a second set of matching complete queries matching any of the first set of rewritten partial search queries. In some implementations, the database searched by the search engine to identify the second set of matching complete queries is the historical complete queries database 132, shown in FIGS. 1, 10, and 12. The search engine 108 sends (520) at least a subset of the second set of matching complete queries to the client system.

Figure 6:
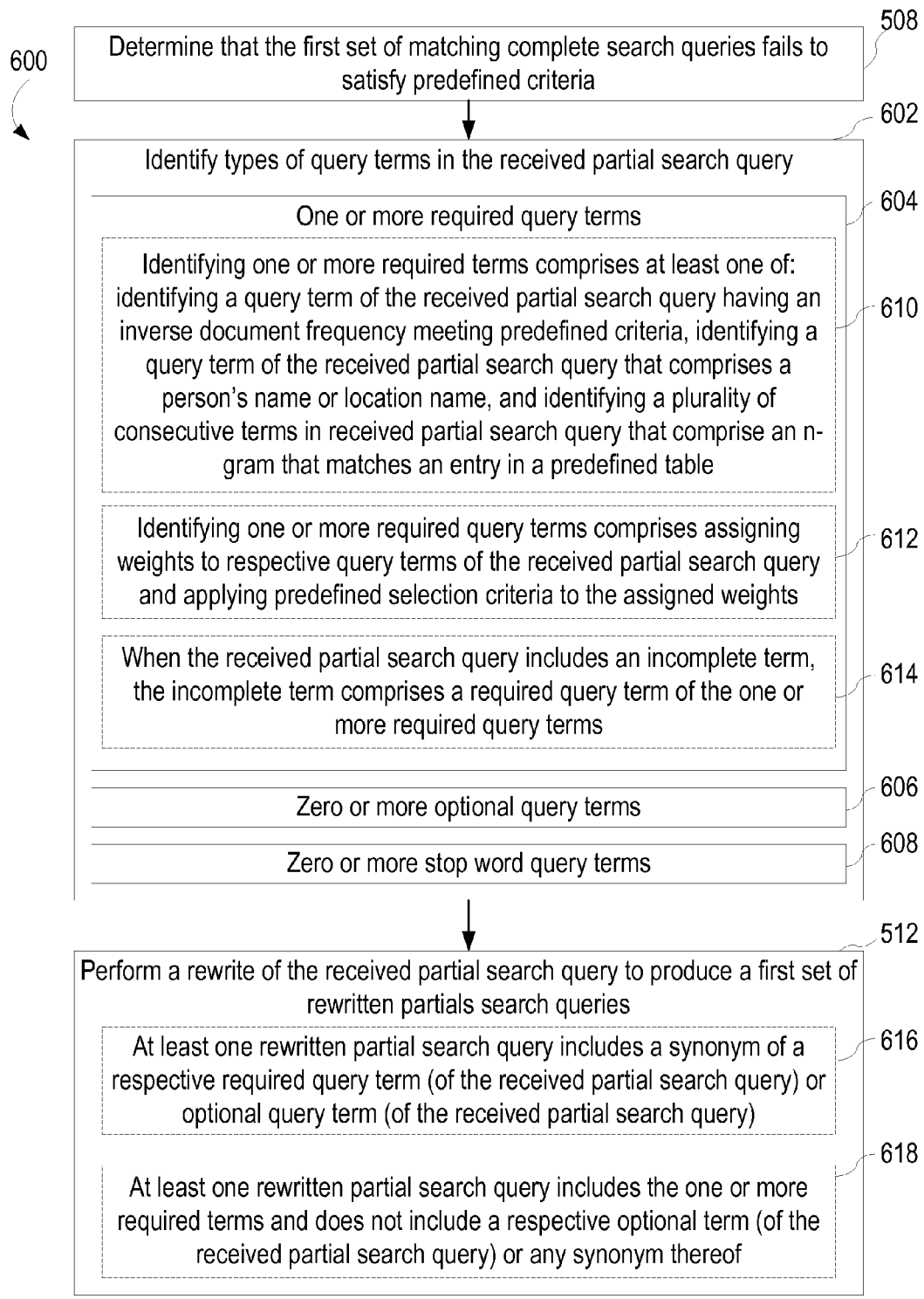
FIG. 6 includes a flow chart of a process for identifying types of query terms, in accordance with some embodiments.

FIG. 6 depicts a flow chart of a process 600 for identifying types of query terms, in accordance with some embodiments. In some embodiments, after the search engine 108 determines that the first set of matching complete queries fails to satisfy (508) predefined criteria, shown in FIG. 5, the search engine 108 identifies (602) the types of query terms in the received partial search query. Alternatively, the search engine 108 identifies (602) the types of query terms in the received partial search query prior to determining whether the first set of matching complete queries fails to satisfy the predefined criteria. In some implementations, the types of query terms are required query terms, optional query terms, and stop word query terms. Generally, the search engine 108 identifies (604) one or more required query terms in the received partial search query having a plurality of terms. Depending on the query terms of the received partial query, the search engine 108 identifies (606) zero or more optional query terms in the received partial search query having a plurality of terms. Similarly, depending on the query terms of the received partial search query, the search engine 108 identifies (608) zero or more stop query word terms in the received partial search query having a plurality of terms.

In some embodiments, identifying the one or more required query terms includes at least one of: identifying (610) a query term of the received partial search query having an inverse document frequency meeting predefined criteria; identifying (if present in the received partial search query) a query term of the received partial search query that comprises a person's name, product name or brand, or location name; and identifying a plurality of consecutive terms in received partial search query that comprise an n-gram that matches an entry in a predefined table. In some implementations, each n-gram in the predefined table corresponds to a multi-word concept or phrase.

In some embodiments, identifying the one or more required query terms comprises (612) assigning weights to respective query terms of the received partial search query and applying predefined selection criteria to the assigned weights. In some embodiments, in accordance with a determination that the partial search query includes (614) an incomplete term, the incomplete term comprises a required query term of the one or more required query terms.

For example, in the search query "radiohead tour dates cal^" (where ^ denotes the cursor's position at the client system 102) "cal" is an incomplete term. In some embodiments, "cal" would be a required term because it is an incomplete term. For example, in the search query "radiohead tour dates cal ^" (where ^ denotes the cursor's position) "cal" would not be an incomplete term because there is a space between "cal" and the cursor's position. For example, in the search query "radiohead^ tour dates cal" (where ^ denotes the cursor's position) "cal" would not be an incomplete term but "radiohead^" is an incomplete term because the cursor's position indicates that a user intends to edit the term. Additional examples are described below with reference to FIGS. 13A and 13B.

In some embodiments, after identifying (602) the types of query terms in the received partial search query, the search engine 108 performs (512, see also FIG. 5) a rewrite of the received partial search query to produce a first set of rewritten partial search queries. In some implementations, the first set of rewritten partial search queries includes at least one rewritten partial search query that includes (616) a synonym of a respective required query term (of the received partial search query) or optional term (of the received partial search query). In some implementations, the first set of rewritten partial search queries includes at least one rewritten partial search query that includes (618) the one or more required terms (of the received partial search query) and does not include a respective optional query term (of the received partial search query) or any synonym thereof.

Figure 7:
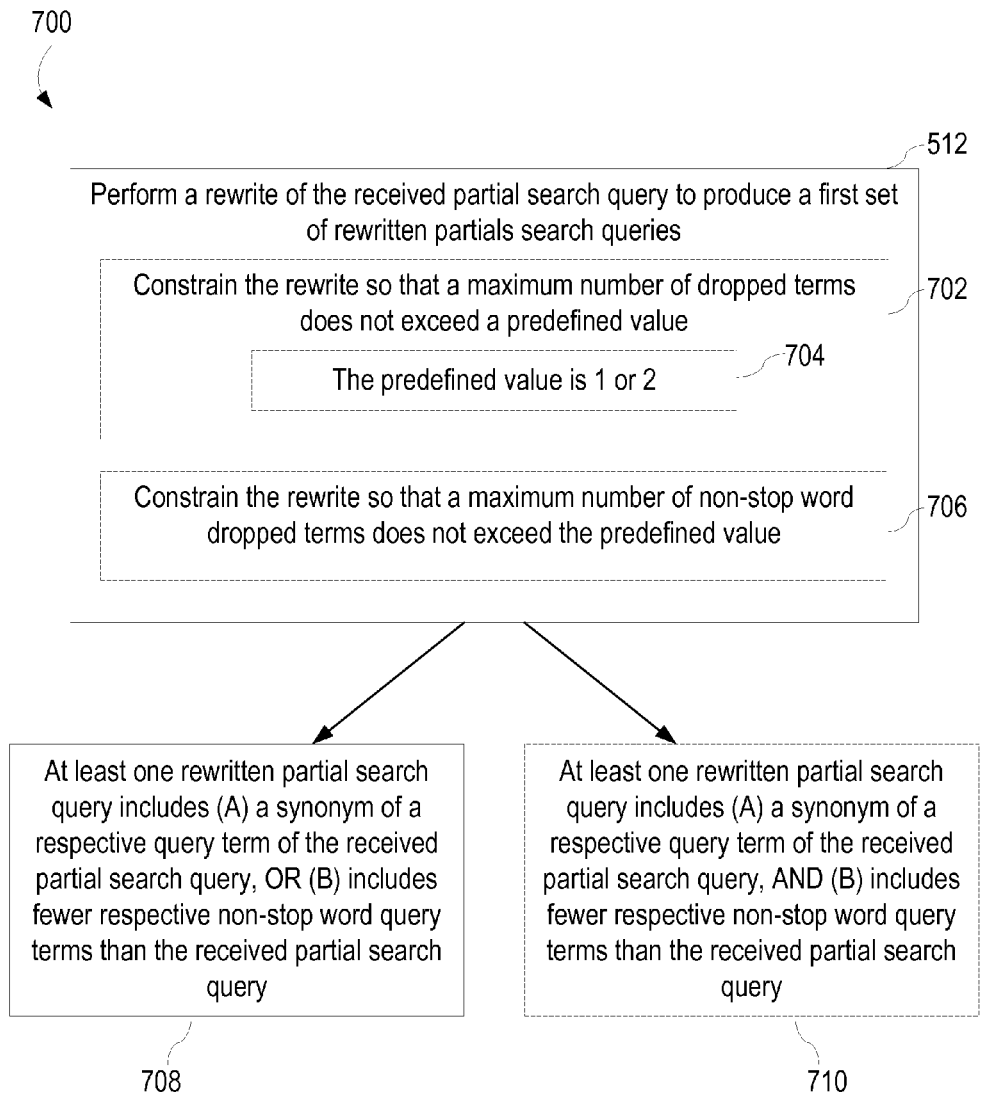
FIG. 7 includes a flow chart of a process for producing a first set of rewritten partial search queries, in accordance with some embodiments.

FIG. 7 depicts a flow chart of a process 700 for producing a first set of rewritten partial search queries, in accordance with some embodiments. In some embodiments, the search engine 108 performs (512, see also FIG. 5) a rewrite of the received partial search query to produce a first set of rewritten partial search queries. For any respective query of the first set of rewritten partial search queries, the number of dropped terms (if any) is the difference between the number of query terms in the received partial search query and the number of query terms in that respective query. In some implementations, the rewrite of the partial search query is constrained (702) so that a maximum number of dropped terms does not exceed a predefined value. Optionally, and typically, the predefined value is 1 or 2 (704).

Alternatively, the rewrite of the partial search query is constrained (706) so that a maximum number of non-stop word dropped terms does not exceed a predefined value. For any respective query of the first set of rewritten partial search queries, the number of non-stop word dropped terms (if any) is the difference between the number of non-stop word query terms in the received partial search query and the number of non-stop word query terms in that respective query.

In some cases (e.g., depending on characteristics of the received partial search query), at least one rewritten partial search query includes (A) a synonym of a respective query term of the received partial search query, or (B) includes fewer respective non-stop word query terms than the received partial search query (708). Furthermore, in some cases (e.g., depending on characteristics of the received partial search query), at least one rewritten partial search query includes (A) a synonym of a respective query term of the received partial search query, and (B) includes fewer respective non-stop word query terms than the received partial search query (710).

Figure 8:
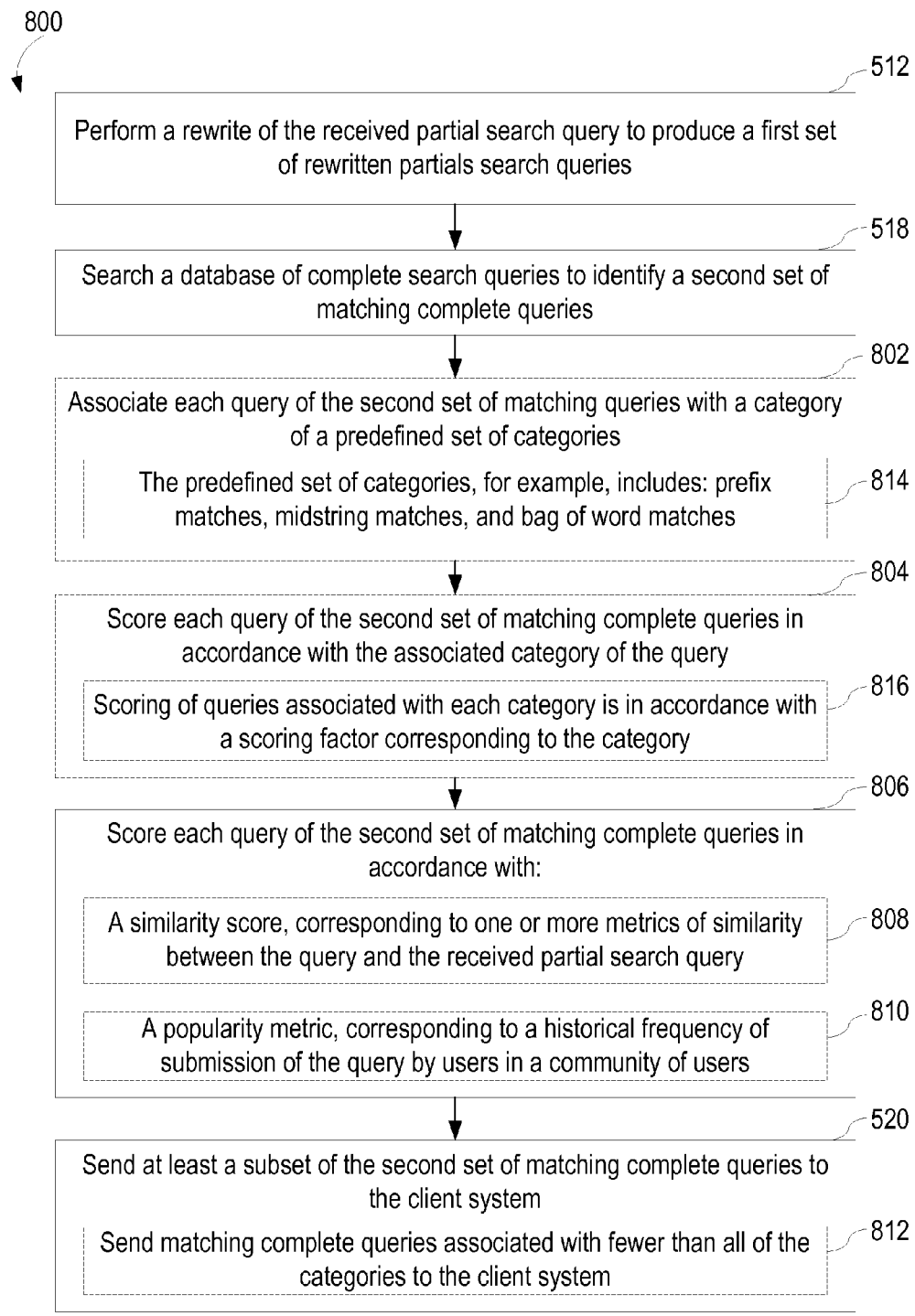
FIG. 8 includes a flow chart of a process for scoring each query of a second set of matching complete queries, in accordance with some embodiments.

FIG. 8 depicts a flow chart of a process 800 for scoring each query of a second set of matching complete queries that match any of the rewritten partial search queries in the first set of rewritten partial search queries, in accordance with some embodiments. As discussed above, in some embodiments, the search engine 108 performs (512, see also FIG. 5) a rewrite of the received partial search query to produce a first set of rewritten partial search queries. The search engine 108 then searches (518, see also FIG. 5) the database of complete search queries to identify a second set of matching complete queries matching any of the first set of rewritten partial search queries.

In some embodiments, the search engine 108 associates (802) each query of the second set of matching complete queries with a category of a predefined set of categories (e.g., prefix matches, midstring matches, and bag of words matches 814).

In some implementations, a "prefix match" includes the entire received partial search query and appends additional terms and/or characters to the received partial search query. For example, in the search query "beautiful red sk^" (where ^ denotes the cursor's position), exemplary prefix matches are "beautiful red sky" or "beautiful red sky lights." In some implementations, a prefix match is either the aforementioned prefix match or an optionalized prefix match. In some implementations, the optionalized prefix match preserves the order of the query terms in the received partial search query (i.e., it includes a subset of the query terms of the received partial search query in the same order as in the received partial search query), appends additional terms and/or characters to the received partial search query, and drops (i.e., does not include) one or more respective terms of the received partial search query. For example, in the search query "beautiful red sk^" (where ^ denotes the cursor's position), an exemplary optionalized prefix match is "beautiful sky."

In some implementations, a "midstring match" includes the entire received partial search query, with the query terms in the same order as in the received partial search query, and adds one or more additional terms and/or characters to the received partial search query, including at least one term or character added at a position other than the end of the received partial search query. For example, in the search query "beautiful red sk^" (where ^ denotes the cursor's position), an exemplary midstring match is "really beautiful red sky." In some implementations, a midstring match is either the aforementioned midstring match or an optionalized midstring match. In some implementations, the optionalized midstring match preserves the order of the query terms in the received partial search query (i.e., it includes a subset of the query terms of the received partial search query in the same order as in the received partial search query), adds terms and/or characters to the received partial search query, including at least one term or character added at a position other than the end of the received partial search query, and drops (i.e., does not include) one or more respective terms of the received partial search query. For example, in the search query "beautiful red sk^" (where ^ denotes the cursor's position), an exemplary optionalized midstring match is "really beautiful sky."

In some implementations, a "bag of words match" adds one or more terms and/or characters to the received partial search query and transposes respective terms of the received partial search query. For example, in the search query "beautiful red sk^" (where ^ denotes the cursor's position), an exemplary bag of words match is "red and beautiful sky." In some implementations, a bag of words match is either the aforementioned bag of words match or an optionalized bag of words match. In some implementations, the optionalized bag of words match adds one or more terms and/or characters to the received partial search query, transposes respective terms of the received partial search query, and drops (i.e., does not include) one or more respective terms of the received partial search query. For example, in the search query "beautiful red sk^" (where ^ denotes the cursor's position), an exemplary optionalized bag of words match is "sky beautiful."

In some embodiments, after the search engine 108 associates (802) each query of the second set of matching complete queries with a category (e.g., prefix matches, midstring matches, and bag of words matches 814), each query is scored (804) by the search engine 108 in accordance with the associated category of the query. In some implementations, the scoring of queries associates with each category is in accordance with a scoring factor (816) corresponding to the category.

In some embodiments, each query of the second set of matching complete queries is scored (806) by the search engine 108 in accordance with a similarity score and a popularity metric (e.g., a frequency). In some implementations, the similarity score (808) corresponds to one or more metrics of similarity between the query and the received partial search query. In some implementations, the popularity metric (810) corresponds to a historical frequency of submission of each query (of the second set of matching complete queries) by users in a community of users. In one example, the score for a respective query corresponds to the product generated by multiplying the similarity score by the popularity metric. Optionally, the score for is generated by multiplying the similarity score, the popularity metric, and a category scoring factor (see discussion of categories, above).

In some embodiments, after the search engine 108 scores each query of the second set of matching complete queries, at least a subset of the second set of matching complete queries is sent (520, see also FIG. 5) to the client system 102. In some implementations, a subset of the second set of matching complete queries from fewer than all of the categories (e.g., prefix matches and midstring matches, but not bag of words matches) is sent (812) to the client system 102.

Figure 9:
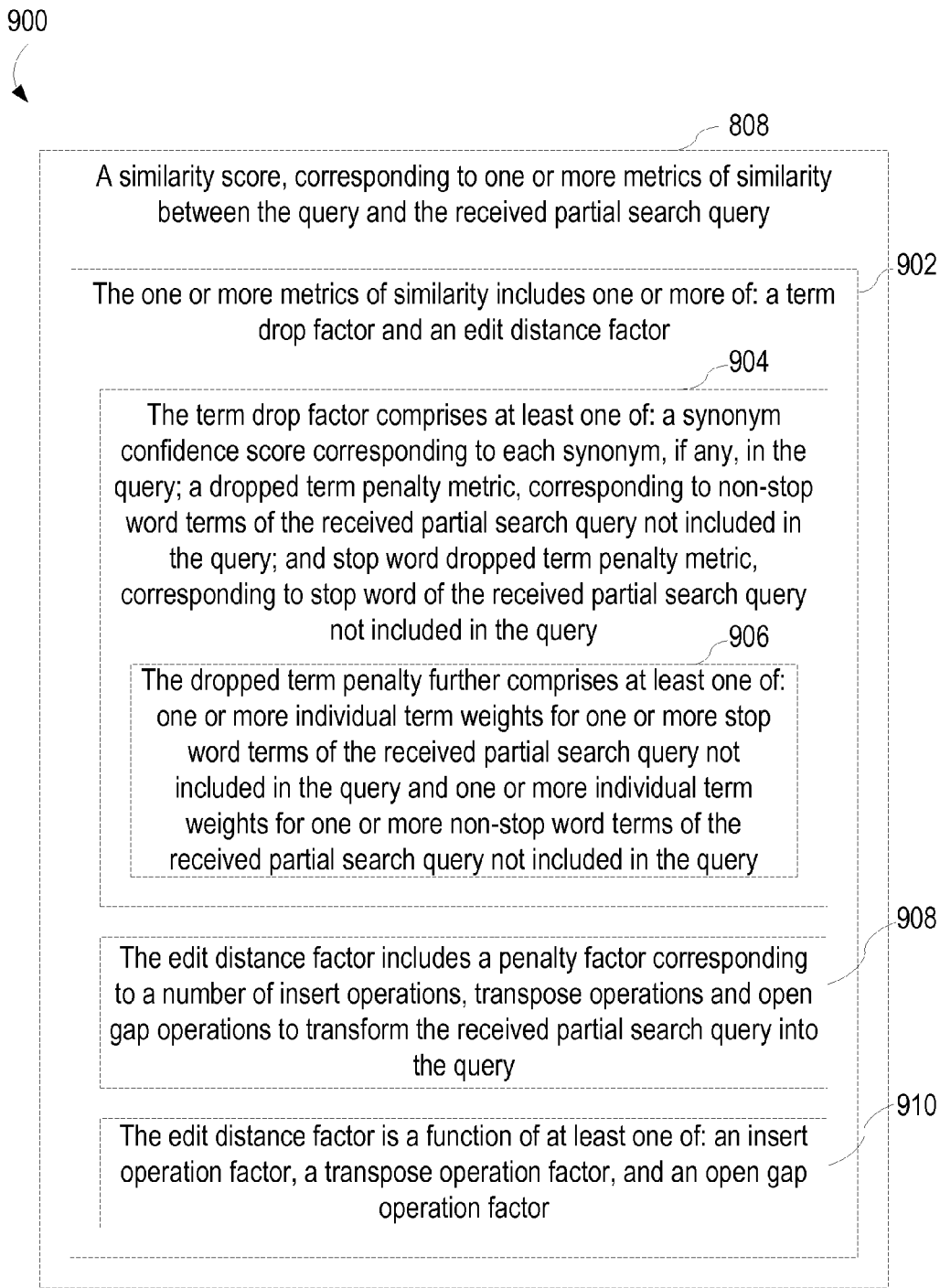
FIG. 9 includes a flow chart of a process for generating a similarity score, in accordance with some embodiments.

FIG. 9 depicts a flow chart of a process 900 for generating a similarity score, in accordance with some embodiments. In some embodiments, the similarity score (808), shown in FIG. 8, corresponds to one or more metrics of similarity between a respective query of the second set of matching complete queries and the received partial search query. In some implementations, the one or more metrics of similarity include one or more of a term drop factor and an edit distance factor (902). For example, in computing the similarity score between a respective query of the second set of matching complete queries and the received partial search query, the term drop factor, multiplied by a corresponding weight, is added to the edit distance factor, multiplied by a corresponding weight.

In some embodiments, depending on characteristics of the received partial search query, the term drop factor for a respective query (of the second set of matching complete queries) comprises at least one of: a synonym confidence score (904) corresponding to each synonym, if any, in the query; a dropped term penalty metric (904), corresponding to respective non-stop word terms of the received partial search query not included in the query; and a stop word dropped term penalty metric (904), corresponding to respective stop words of the received partial search query not included in the query.

In some embodiments, depending on characteristics of the received partial search query, the term drop factor for the respective query further comprises at least one of: one or more individual term weights (906) for one or more stop word terms of the received partial search query not included in the query; and one or more individual term weights (906) for one or more non-stop word terms of the received partial search query not included in the query.

For example, the received partial search query is "dr spock office in mound plea," and a matching complete query is "dr spock mount pleasant sc." In this example, in computing the term drop factor, the query terms "in" and "office" have been dropped in the matching complete query. (The query term "in" is a stop word and the query term "office" is a non-stop word.) Also, the query term "mound" has been replaced with the synonym "mount," which has a corresponding synonym confidence score, in the matching complete query. In this example, the term drop factor is computed by adding the one or more stop word drops ("in"), multiplied by a stop word drop factor, to the one or more non-stop word drops ("office"), multiplied by a non-stop word drop factor, and added to the synonym confidences scores of the one or more synonyms ("mount"), and the result value is normalized by the quantity of query terms in the received partial search query to produce the term drop factor.

In some implementations, those portions (if any) of the candidate suggested query (i.e., a respective query of the second set of matching complete queries) positioned after the last term that matches a term in the prefix (i.e., the received partial query) are ignored when computing the non-stop word drop factor and the edit distance factor. The presence of these portions in a candidate suggested query does not indicate any increase in dropped terms, and does not indicate any increase in dissimilarity to the prefix. For this reason, no penalty is assessed for terms in the candidate suggested query positioned after the last matching term when scoring the candidate suggested query.

In some embodiments, the edit distance factor includes a penalty factor (908) corresponding to a number of word-level edit operations (e.g., word-level insert operations, transpose operations, and open gap operations) to transform the received partial search query into the respective query, excluding those portions of the respective query positioned after the last term that matches a term in the received partial query. In some embodiments, the received partial search query is encoded to a respective sequence of tokens, each token representing an entire word or term in the query, and the respective query is encoded to a respective sequence of tokens. Synonyms between received partial search query and the respective query are encoded to like tokens. Terms occurring in the respective query after the last matched query term of the received partial search query are truncated and not encoded to a token in the respective sequence.

For example, in computing the edit distance factor, the received partial search query ("dr spock office in mound plea") is encoded to ABCDEF (dr→A; spock→B; office→C; in→D; mound→E; plea→F). The matching complete query ("dr spock mount pleasant sc") is encoded to ABEF (dr→A; spock→B; mount→E; pleasant→F; sc→truncated). The final query term—"sc"—of the matching complete query is truncated because it occurs after the last matching term of the received partial search query. The query terms "mound" and "mount" are encoded to the same token—E—because they are synonyms. The edit distance between the encoded sequences ABEF and ABCDEF is 3 (wherein all word-level operations are the same weight) because it takes two insertion operations and one open gap operation to transform ABEF into ABCDEF. A gap needs to be opened between tokens B and E, and two tokens—C and D—need to be inserted into this gap. The edit distance factor is then computed by determining the maximum between zero and the normalized edit distance, normalized by the quantity of query terms in the received partial search query.

Alternatively, in some embodiments, the edit distance factor for a respective query is a function of at least one of: an insert operation factor, a transpose operation factor, and an open gap operation factor (for opening a gap between tokens of the encoded sequence in order to insert one or more tokens to the sequence which are encoded to respective additional query terms) (910). In some implementations, the edit distance includes a count of edit operations, excluding operations accounted for in the term drop factor, to transform the received partial search query into the respective query. In some implementations, the edit distance factor comprises, or is a variation of the Levenshtein distance or the Damerau-Levenshtein distance.

In some implementations, the edit distance factor excludes changes to the received partial search query caused by dropping terms of the received partial search query. In some implementations, the edit distance factor excludes tokens and/or terms appended to the end of the received partial search query. In some implementations, respective edit operations (e.g., insert, transpose, and open gap) are given different weights when computing the edit distance.

Although some of the flow charts in FIGS. 2-9 illustrate a number of logical stages or operations in a particular order, stages or operations that are not order dependent may be reordered and other stages or operations may be combined or broken out. While some reordering or other groupings are specifically mentioned, others can be accomplished by those of ordinary skill in the art without requiring specific guidance, and so an exhaustive list of alternatives is not presented here. Moreover, it should be recognized that at least some of the stages or operations shown in the flow charts could be implemented in hardware, firmware, software or a combination thereof.

FIG. 10 depicts a block diagram of a search engine system 208 (sometimes called a search engine), in accordance with some embodiments. The search engine 208 typically includes one or more processors (sometimes called processing units or CPUs) 1002 for executing modules, programs and/or instructions stored in memory 1004 and thereby performing processing operations; one or more network or other communications interfaces 1006; memory 1004; and one or more communication buses 1008 for interconnecting these components. The communication buses 1008 optionally include circuitry (sometimes called a chipset) that interconnects and controls communications between system components. Memory 1004 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1004 may optionally include one or more storage devices remotely located from the CPU(s) 1002. Memory 1004, or alternately the non-volatile memory device(s) within memory 1004, comprises a non-transitory computer readable storage medium. In some embodiments, memory 1004, or the computer readable storage medium of memory 1004 stores the following programs, modules and data structures, or a subset thereof:

- an operating system 1010 that includes procedures for handling various basic system services and for performing hardware dependent tasks;
- a network communication module 1012 that is used for connecting the search engine server system 208 to other computers via the one or more communication interfaces 1006 (wired or wireless) and one or more communication networks, such as the Internet, other wide area networks, local area networks, metropolitan area networks, and so on (see communication network(s) 106, FIG. 1);
- a query server 110 for receiving full or partial search queries and returning search results, documents, matching complete search queries, and predicted search results;
- a prediction server 112 for receiving partial search queries and returning a set of matching complete queries;
- a query processing controller 114 for executing complete search queries and providing search results to a requesting client;
- a cached results server 116;
- a document database 118; and
- an inverse document index 120 for storing documents ranked by popularity.

In some embodiments, the query server 110, which is typically implemented using separate server(s), includes the following elements or a subset of such elements: a client communications module 122 for receiving and transmitting information; a query completion module 124 for receiving matching complete queries and predicted search results from prediction server 212; a query log 126 of previously completed search queries submitted by users in a community of users; and a query receipt, processing and response module 128 for receiving and responding to full search queries either entered or selected from lists of complete queries.

In some embodiments, the prediction server 112 includes the following elements or a subset of such elements: a partial query handler 130 which receives partial search queries from the query autocomplete module 124 and predicts complete search queries using the historical complete queries database 132; a historical queries database 132 which stores complete search queries submitted by users in a community of users; and an ordered set builder 134 which processes log records (in query log 126) of previously completed search queries submitted by users in a community of users to generate the historical queries database 132.

Each of the above identified modules, applications or programs corresponds to a set of instructions, executable by the one or more processors of client system 104, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 1004 may store a subset of the modules and data structures identified above. Furthermore, memory 1004 may store additional modules and data structures not described above.

Although FIG. 10 shows "a search engine sever system" 108, FIG. 10 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 10 could be implemented on single servers and single items could be implemented by one or more servers. For example, as shown in FIG. 1, the query server 110 and prediction server 112 are optionally implemented using servers or server systems distinct from the servers used to implement other portions of the search engine sever system 108. The actual number of servers used to implement a search engine system 108 and how features are allocated among them will vary from one implementation to another, and may depend in part on the amount of data traffic that the system must handle during peak usage periods as well as during average usage periods.

FIG. 11 depicts a block diagram of a client system 102 (sometimes called a client), in accordance with some embodiments. The client 102 typically includes one or more processors (sometime called processing units or CPUs) 1102, one or more network or other communications interfaces 1104, memory 1106, and one or more communication buses 1108 for interconnecting these components. The communication buses 1108 optionally include circuitry (sometimes called a chipset) that interconnects and controls communications between system components. The client system 102 optionally includes (and typically does include) a user interface 1110 comprising a display device 1112 and a keyboard/mouse 1114 or other input mechanism. Memory 1006 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 1106 optionally includes one or more storage devices remotely located from the CPU(s) 1102. Memory 1106, or alternately the non-volatile memory device(s) within memory 1106, comprises a non-transitory computer readable storage medium. In some embodiments, memory 1106 or the computer readable storage medium of memory 1106 stores the following programs, modules and data structures, or a subset thereof:
- an operating system 1116 that includes procedures for handling various basic system services and for performing hardware dependent tasks;
- a communication module (or instructions) 1118 that is used for connecting the client system 102 to other computers via the one or more communications network interfaces 1104 (wired or wireless) and one or more communications networks, such as the Internet, other wide area networks, local area networks, metropolitan area networks, and so on; and
- a browser application 1120 for accessing documents, such as web pages, stored locally or remotely from client 102, and for receiving input search queries from a user of client 102 and for displaying search results;
- a search assistant 1122; and
- a web page or other document 1140 that is rendered by browser application 1120 for presentation to a user of client 102 via user interface 1110.

In some embodiments, the search assistant 1122 is separate from the browser application 1120, while in other embodiments the search assistant is incorporated in the browser application 1120. For example, in some implementations, search assistant 1122 is implemented, at least in part, in a plug-in or other extension of browser application 1120. In some implementations, search assistant 1122 is implemented, at least in part, as instructions embedded in a web page, such as web page 1140, rendered by the browser application 1120.

In some implementations, search assistant 1122 includes the following elements, or a subset of such elements: an entry and user action monitoring module (or instructions) 1124 for monitoring the entry of search queries and user actions on search queries (e.g., modifying and/or non-modifying user actions) and selecting query information and user action information for transmission to the search engine; a transmission module (or instructions) 1126 for transmitting partial search queries, complete search queries, selected matching complete search queries, and user action information to the search engine; a query suggestion receipt module (or instructions) 1128 for receiving matching complete search queries; a predicted search results receipt module (or instructions) 1130 for receiving predicted queries and preparing them for presentation to the user of client 102 (e.g., preparing them for rendering by browser application 1120 and presentation via user interface 1112); and a search results receipt module (or instructions) 1132 for receiving search results and preparing them for presentation to the user of client 102. The transmission of final (i.e., completed) queries, receiving search results for completed queries, and displaying such results is handled by browser application 1120, search assistant 1122, or a combination thereof.

Each of the above identified modules, applications or programs corresponds to a set of instructions, executable by the one or more processors of client system 104, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 1106 may store a subset of the modules and data structures identified above. Furthermore, memory 1106 may store additional modules and data structures not described above.

Although illustrated in FIGS. 10 and 11 as distinct modules or components, the various modules or components may be located or co-located within either search engine 108 or client 102. For example, in some embodiments, some portions or functions described above as belonging to search engine 108 are instead implemented by client 102. For example, in some embodiments query completion tables for the most popular searches in the historical queries database 132 are periodically downloaded to client 102, thereby providing fully client-based query completion candidates and query refinement candidates for at least some queries. Further, client 102 may merge (e.g., by interleaving) locally generated and remotely generated results for presentation to the user.

FIG. 12 depicts a portion of a historical queries database 132 used in identifying a set of matching complete queries, in accordance with some embodiments. The historical queries database 132 stores a list of queries 1202 entered by users in a community of users. Data regarding the historical frequency of submission 1204 of each search query is also stored. In some embodiments, the historical queries database 132 only allows query results to be returned if they have an historical frequency of submission above a predetermined threshold. As such, very rare queries would not be accessible in the database of historical complete queries 132. For example, if the threshold was 100 submissions, then the query "Amnesiac" 1216, which only has 89 submissions, would not be returned. Thus, the historical queries database 132 can be a useful tool in determining whether complete search queries are popular enough to be good matching complete search queries. Not storing (or returning) very rare queries is also useful in making sure that personally identifiable information, such as very rare and personally specific query candidates, are not provided to "general users" as suggested query completions or suggested query refinements. (It is noted that such queries might be returned to the original authors of those queries as suggested queries or refinements, using mechanisms other than those discussed in this document.)

In some embodiments, the historical query database 132 only stores queries that have received search result clicks above a predefined threshold. Examples of queries stored in the historical queries database in order of popularity include: "You Tube" 1206, "Radiohead" 1208, "Thom Yorke" 1210, "OK Computer" 1212, "In Rainbows" 1214, and "Amnesiac" 1216. It should be noted that the frequency of submission of queries in the historical queries database 132 stores the total frequency of submission of a query, optionally excluding various query submissions, such as multiple submissions of the same query by a single user (or set of users at the same IP address or otherwise identified as the same or potentially the same or related user).

FIG. 13A depicts an example of a partial search query "radiohead tour dates c^" 1302 (where ^ 1310 denotes the cursor's position), and corresponding complete search queries 1304, which are suggested to the user, in accordance with some embodiments. The complete queries 1304 correspond to a first set of matching complete queries, wherein the first set of matching complete queries satisfy predefined criteria (210—Yes, FIG. 2).

FIG. 13B depicts another example of a partial search query "radiohead tour dates c^" 1308 (where ^ 1310 denotes the cursor's position), and corresponding complete search queries 1306, which are suggested to the user, in accordance with some embodiments. The matching complete queries 1306 correspond to a second set of matching queries, wherein a first set of matching complete queries failed to satisfy predefined criteria (210—No, FIG. 2), notwithstanding the complete queries 1304 in FIG. 13A.

In this example, "radiohead" 1312 is a required query term, "tour" and "dates" 1312 are optional query terms, and "c" 1314 is an incomplete query term of the received partial search query "radiohead tour dates c^" 1308. The query term "c" 1316 is an incomplete query term because the cursor's position (where ^ 1310 denotes the cursor's position) indicates that the user is not finished entering the respective query term.

Further, in this example, matching complete query 1330 ("radiohead concert dates california") includes a synonym of a respective non-stop query term of the received partial search query 1308 ("radiohead tour dates c^"). The term "concert" is a synonym of the optional query term "tour" 1312, and the term "california" is the completion of incomplete query term "c" 1316.

In the example shown in FIG. 13B, matching complete query 1332 ("thom yorke tour dates california") includes a synonym of a respective non-stop query term of the received partial search query 1308 ("radiohead tour dates c^"). The term "thom yorke" is a synonym of the required query term "radiohead" 1312, and the term "california" is the completion of incomplete query term "c" 1316. (Thom Yorke is a synonym for Radiohead because he is the lead singer of Radiohead.) Furthermore, Thom Yorke is an n-gram because it a multi-word person's name.

In the example shown in FIG. 13B, matching complete query 1334 ("radiohead tour california") includes fewer respective non-stop word query terms than the received partial search query 1308 ("radiohead tour dates c^"). The optional query term "dates" 1314 has been dropped from the matching complete query 1334, and the term "california" is the completion of incomplete query term "c" 1316.

In the example shown in FIG. 13B, matching complete query 1336 ("radiohead show california") includes fewer respective non-stop word query terms than the received partial search query 1308 and a synonym of a respective non-stop query term of the received partial search query 1308 ("radiohead tour dates c^"). In accordance with some embodiments, the optional query term "dates" 1314 has been dropped from the matching complete query 1336, the term "show" is a synonym of the optional query term "tour" 1314, and the term "california" is the completion of incomplete query term "c" 1316.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, performed by a server system having one or more processors and memory storing one or more programs for execution by the one or more processors, comprising:
    receiving from a client system a partial search query having a plurality of query terms;
    searching a database of complete search queries to identify a first set of matching complete queries;
    in accordance with a determination that the first set of matching complete queries fails to satisfy predefined criteria:
        performing a rewrite of the received partial search query to produce a first set of rewritten partial search queries, wherein the first set of rewritten partial search queries includes at least one rewritten partial search query that (A) includes a synonym of a respective query term of the received partial search query, or (B) includes fewer respective non-stop word query terms than the received partial search query, wherein performing the rewrite includes dropping no more than a maximum number of query terms, the maximum number of query terms being based on a difference between a number of query terms in the partial search query and one of the respective rewritten partial search queries rewritten based on (A) or (B);
        searching the database of complete search queries to identify a second set of matching complete queries that match any of the first set of rewritten partial search queries; and
        sending at least a subset of the second set of matching complete queries to the client system.

2. The method of claim 1, further comprising:
    identifying in the received partial search query one or more required query terms, and at least one of:
        one or more optional query terms, and
        one or more stop word query terms, the one or more optional query terms comprising terms of the received partial search query that are not required query terms or stop words; wherein the one or more stop word query terms match terms in a predefined list of stop words.

3. The method of claim 2, wherein identifying one or more required query terms comprises at least one of: identifying a query term of the received partial search query having an inverse document frequency meeting predefined criteria, identifying a query term of the received partial search query that comprises a person's name, product name or brand, or location name, and identifying a plurality of consecutive terms in received partial search query that comprise an n-gram that matches an entry in a predefined table.

4. The method of claim 2, wherein identifying one or more required query terms comprises assigning weights to respective query terms of the received partial search query and applying predefined selection criteria to the assigned weights.

5. The method of claim 2, wherein at least one rewritten partial search query in the first set of rewritten partial search queries includes a synonym of a respective required query term or optional query term.

6. The method of claim 2, wherein, when the received partial search query includes an incomplete term, the incomplete term comprises a required query term of the one or more required query terms.

7. The method of claim 2, wherein, when the received partial search query includes a respective optional query term, the first set of rewritten partial search queries includes at least one rewritten partial search query that includes the one or more required query terms and does not include the respective optional query term or any synonym thereof.

8. The method of claim 1, wherein the received partial search query has a first number of query terms, each query of the first set of rewritten partial search queries has a respective number of query terms, and performing the rewrite is constrained so that a maximum number of dropped terms, comprising a difference between the first number of query terms and the respective number of query terms in each query of the first set of rewritten partial search queries, does not exceed a predefined value.

9. The method of claim 1, wherein the received partial search query has a first number of non-stop word query terms, each query of the first set of rewritten partial search queries has a respective number of non-stop word query terms, and performing the rewrite is constrained so that a maximum number of dropped terms, comprising a difference between the first number of non-stop word query terms and the respective number of non-stop word query terms in each query of the first set of rewritten partial search queries, does not exceed a predefined value.

10. The method of claim 1, wherein the first set of rewritten partial search queries includes at least one rewritten partial search query that (A) includes a synonym of a respective query term of the received partial search query, and (B) includes fewer respective non-stop word query terms than the received partial search query.

11. The method of claim 1, further comprising:
scoring each query of the second set of matching complete queries in accordance with a similarity score, corresponding to one or more metrics of similarity between the query and the received partial search query, and a popularity metric, corresponding to a historical frequency of submission of the query by users in a community of users.

12. The method of claim 11, wherein the one or more metrics of similarity between the query and the received partial search query include one or more of: a term drop factor and an edit distance factor.

13. The method of claim 12, wherein the term drop factor comprises at least one of: a synonym confidence score corresponding to each synonym, if any, in the query; a dropped term penalty metric, corresponding to non-stop word terms of the received partial search query not included in the query; and stop word dropped term penalty metric, corresponding to stop word of the received partial search query not included in the query.

14. The method of claim 13, wherein the dropped term penalty further comprises at least one of: one or more individual term weights for one or more stop word terms of the received partial search query not included in the query and one or more individual term weights for one or more non-stop word terms of the received partial search query not included in the query.

15. The method of claim 12, wherein the edit distance factor includes a penalty factor corresponding to a number of insert operations, transpose operations and open gap operations to transform the received partial search query into the query.

16. The method of claim 12, wherein the edit distance factor is a function of at least one of: an insert operation factor, a transpose operation factor, and an open gap operation factor.

17. The method of claim 1, further comprising:
associating each query of the second set of matching complete queries with a category of a predefined set of categories;
scoring each query of the second set of matching complete queries in accordance with the associated category of the query.

18. The method of claim 1, wherein the predefined criteria comprises criteria with respect to quantity and/or quality of the first set of matching complete queries.

19. The method of claim 1, wherein the partial search query comprises a plurality of non-stop word query terms.

20. A server system, comprising:
one or more processors;
memory; and
one or more programs stored in the memory, the one or more programs comprising instructions for:
receiving from a client system a partial search query having a plurality of query terms;
searching a database of complete search queries to identify a first set of matching complete queries; and
in accordance with a determination that the first set of matching complete queries fails to satisfy predefined criteria:
performing a rewrite of the received partial search query to produce a first set of rewritten partial search queries, wherein the first set of rewritten partial search queries includes at least one rewritten partial search query that (A) includes a synonym of a respective query term of the received partial search query, or (B) includes fewer respective non-stop word query terms than the received partial search query, wherein performing the rewrite includes dropping no more than a maximum number of query terms, the maximum number of query terms being based on a difference between a number of query terms in the partial search query and one of the respective rewritten partial search queries rewritten based on (A) or (B);
searching the database of complete search queries to identify a second set of matching complete queries that match any of the first set of rewritten partial search queries; and
sending at least a subset of the second set of matching complete queries to the client system.

21. A non-transitory computer readable storage medium storing one or more programs configured for execution by a server system, the one or more programs comprising instructions for:

receiving from a client system a partial search query having a plurality of query terms;

searching a database of complete search queries to identify a first set of matching complete queries; and in accordance with a determination that the first set of matching complete queries fails to satisfy predefined criteria:

performing a rewrite of the received partial search query to produce a first set of rewritten partial search queries, wherein the first set of rewritten partial search queries includes at least one rewritten partial search query that (A) includes a synonym of a respective query term of the received partial search query, or (B) includes fewer respective non-stop word query terms than the received partial search query, wherein performing the rewrite includes dropping no more than a maximum number of query terms, the maximum number of query terms being based on a difference between a number of query terms in the partial search query and one of the respective rewritten partial search queries rewritten based on (A) or (B);

searching the database of complete search queries to identify a second set of matching complete queries that match any of the first set of rewritten partial search queries; and sending at least a subset of the second set of matching complete queries to the client system.

* * * * *